2,748,079

DRILLING FLUIDS

Walter J. Weiss, Rolling Hills Area, Calif., assignor to Texaco Development Corporation, New York, N. Y., a corporation of Delaware No Drawing. Application September 6, 1950, Serial No. 183,462

8 Claims. (Cl. 252—8.5)

This invention relates to an improvement in drilling fluids used in the drilling of oil wells, and the like, and more particularly to a drilling fluid of the emulsion-brine type.

Drilling fluids or muds are used in the drilling of wells for tapping underground formations of oil, gas, brine or water. Such fluids have different functions, the most important of which are to assist in the removal of cuttings from the well, to seal off formations of gas, oil or water which may be encountered at different levels, to lubricate the drilling tool and the drill pipe which carries the tool, and to hold the cuttings in suspension in event of shut-downs in drilling.

Drilling muds as conventionally formed are usually mixtures of finely divided solids such as clay in water. Such clays are hydratable and are also subject to flocculation or coagulation by reason of which the viscosity, gelation or gel strength, water-loss and other characteristics of the fluid may be altered to an undesirable extent. If, in drilling, a formation be encountered wherein the constituents thereof are capable of so affecting the drilling fluid, the character of the fluid may be changed in a matter of minutes, oftentimes with unfortunate results. This is particularly true where large salt beds are encountered since salt in large quantities will cause the usual type clay-water drilling fluid to flocculate to an extent to become inoperable. Such clay-water muds also possess the disadvantage that they are of little value in drilling through shale, especially so-called heaving shale, since the shale tends to slough to an extent to make the drilling of a true gauge well bore impossible.

In overcoming the aforesaid disadvantages, it is an object of this invention to provide a novel drilling fluid characterized by its resistance to contamination by salt or any other formation that may be encountered in drilling.

A further object of the invention is the provision of a novel drilling fluid characterized by its ability to drill a true gauge well bore, particularly through shale bodies characterized by a high degree of sloughing when drilled with the more conventional clay-water fluids.

Still a further object of the invention is to provide a novel drilling fluid characterized by high lubricating properties and relatively low-water loss.

In brief, the invention may be said to relate to a brine-base drilling fluid having as its principal constituents a brine and saponin, a starch usually being used also. Drilling mud clay may or may not be used. More specifically, the invention contemplates the use of the above fluid with oil to form an emulsion-type mud.

The brine may be formed by saturating water with water-soluble alkali metal salts (salts of sodium, potassium, etc.) or alkaline earth metal salts (salts of calcium, barium, strontium, etc.) or combinations thereof. The more common and cheaper salts such as sodium chloride and calcium chloride are preferred although it is to be understood that other salts of these classes may be used. The brines can be prepared with a water solution containing from 0 to 100 per cent of the alkali metal salt and 100% to 0% of the alkaline earth metal salt. For example, a brine may be prepared from a substantially saturated solution of sodium chloride through various ratios of sodium chloride and calcium chloride to substantially saturated calcium chloride.

The term "saponin" as used herein is intended to cover saponins per se, source materials such as powdered soap wood bark and a number of varieties of plants such as quillaia, soapwort, soaproots, digitalis, the Saponaria species and Hippocastanacae. Saponin is considered a glycoside. Typical soponins are digitonin, gitonin and tigonin. The crude soponin product presently sold as powdered soap wood bark is preferred for the present purpose because of its relative cheapness and ready availability.

The term "starch" as used herein is intended to cover such prehydrolyzed products as wheat paste or starch products of the type sold under the trade names Impermex, Parrite or Mylogel, the last three named being proprietary starch products sold for use in drilling muds. However, the term "starch" as used herein is also intended to cover other products containing carbohydrate material as well as corn starch, wheat starch and potato starch. Such other products include corn meal, wheat flour, potato flour, buckwheat flour, rye flour, whole wheat flour, soya bean flour, and soya bean grits. In calcium-brine systems of the type later described, it is desirable to use such of the above as are prehydrolyzed. While the physical and chemical characteristics of mixes prepared from these various materials will vary to some extent with some materials being superior to others, all are capable of use. Wheat paste or the proprietary starch products mentioned above are preferred.

The above constituents of the drilling fluid may be varied widely in porportions to fit the actual drilling conditions anticipated, it being understood that the following examples are only by way of illustration.

A typical caustic fluid illustrative of the invention was prepared by mixing five pounds of sodium hydroxide with about one API barrel of water. About 20 lbs. of a propietary starch product, namely "Linit" brand laundry starch, was added with varying amounts of soap wood bark as indicated below. To this was added a defoaming agent and about ¼ barrel of crude oil. The mixture was then saturated with sodium chloride, the final solution corresponding to about 120 lbs. per barrel of mix water.

To enable laboratory tests 10 lbs. of filler clay was added. Filler clay is a relatively inert solid and functions only as a filler medium as distinguished from regular drilling mud clay which is hydratable and subject to flocculation. Weighting material such as filter clay or barytes requires colloidal support and by itself will settle out. This is not true of drilling mud clay.

When subjected to test for water-loss, with the soap wood bark present in amounts varying from none to 5 lbs. per API barrel, the following results were secured:

| Soap Wood Bark Content | API Water-Loss, cc./hr. | Remarks |
|---|---|---|
| 0 lb./API bbl | 1.6 to 0.1 cc. Oil | Free Oil Present. |
| 1 lb./API bbl | 0.6 | No free oil present in any filtrate. Emulsion stable. |
| 2 lb./API bbl | 1.1 | |
| 3 lb./API bbl | 1.2 | |
| 5 lb./API bbl | 1.4 | |

The data given above with respect to water-loss was determined by conventional tests conducts in an API filter press at 100 lbs. per square inch at room temperature.

The following is an example of a drilling fluid containing calcium chloride. In preparing this fluid, soap wood bark in the amounts indicated below was added to 1 API barrel of water, this addition being followed by 99 lbs. of sodium chloride and 11 lbs. of calcium chloride giving a proportion of 90% sodium chloride and 10% calcium chloride. 15 lbs. of wheat paste, 5 lbs. of yellow dextrine, ¼ bbl. of crude oil and 10 lbs. of filler clay were added in the order named, the last-mentioned ingredient being used solely for the purpose of laboratory tests. The results of the viscosity tests and water loss tests are listed below. The viscosity tests were conducted at 600 R. P. M. at 77° F. on a Stormer type viscosimeter wherein modification had been made to improve the control of the times and rates of rotation.

| Soap Wood Bark Content | Stormer Viscosity, 600 R.P.M., 77° F. | API Water-loss, cc./hr. |
| --- | --- | --- |
| | cps. | |
| ½ lb./API bbl | 33.6 | 2.4 |
| 1 lb./API bbl | 35.0 | 1.8 |
| 2 lb./API bbl | 39.4 | 1.8 |

The emulsions remained stable and there was no free oil.

The crude oil used in the above tests was a Baumann lease crude obtained from the Baumann lease from Signal Hill Field of California.

Drilling fluids containing drilling mud clay were prepared by adding different amounts of soap wood bark as indicated below to 0.9 A. P. I. bbl. water, 109 lbs. CaCl₂, 54.2 lbs. drilling mud clay known as P–95, 10 lbs. "Red Stave" wheat paste and ¼ bbl. crude oil. On testing, the following results were secured.

| Soap Wood Bark Content | Stormer Viscosity, 600 R.P.M., 77° F. | API Water-loss, cc./hr. |
| --- | --- | --- |
| | cps. | |
| 0 lbs./API bbl | 61.6 | 2.0 |
| 1 lbs./API bbl | 60.3 | 1.2 |
| 2 lbs./API bbl | 61.3 | 1.35 |

When soap wood bark was used, the emulsion remained stable.

In another case soap wood bark in varying amounts was added to a ±60 second (1500 cc. in–1000 cc. out) API funnel viscosity 1:1 Rogers Lake-McKittrick Light clay-water mud +20% by volume diesel oil. The water-loss tests gave the following results:

| Soap Wood Bark Content | API Water-loss, cc./hr. |
| --- | --- |
| 0 lb./API bbl | 10.2+0.8 cc. oil. |
| 1 lb./API bbl | 8.9+0.2 cc. oil. |
| 2 lb./API bbl | 8.0—no oil. |
| 3 lb./API bbl | 7.8—no oil. |

The fluid of the present invention involving a brine base, with or without the usual hydratable clay, is particularly advantageous since it is not subject to contamination in the manner characteristic of the usual water-clay mud. If large salt beds are encountered with the fluids of this invention, there is little or no effect upon the properties of the fluid as contrasted to the effect, namely, flocculation, on normal clay-water drilling muds. The ability of the fluid to tolerate salt is unquestionable since the basic salt content thereof is about 250,000 parts per million. This is about six times the highest salt tolerance that has ever been claimed for prior fluids.

A further advantage, particularly in the use of such fluids having appreciable quantities of calcium chloride therein, is in the drilling of so-called heaving shale composed of hydratable shale bodies. Not only does the calcium chloride brine suppress hydration but the calcium ion also converts the hydratable shale which is predominately of a sodium base into a less hydratable calcium base.

The fluids have the further advantages that they have high lubricating properties and exhibit relatively low-water losses, i. e., the rates at which water is lost to the formation. Furthermore, they are able to drill a true gauge well bore through shale bodies without appreciable sloughing of the shale.

The saponin technique disclosed herein, either with or without the oil, but preferably with, is also of value in reducing water-loss in drilling fluids of the highly electrolytic type, i. e., fluids containing up to 30% alkali metal hydroxides or chlorides or alkali metal salts of weak inorganic acids and organic acids. Typical of the latter compounds are the carbonate, sulphite and phosphate of sodium, and the acetate, propionate and butyrate of sodium. In actual tests, it has been found possible to reduce water-loss by 80 to 85%.

Obviously many modifications and variations of the invention, as hereinbefore set forth, may be made without departing from the spirit and scope thereof and, therefore, only such limitations should be imposed as are indicated in the appended claims.

I claim:

1. A brine base oil emulsion type of drilling fluid for drilling through subsurface formations characterized by its resistance to contamination by calcium ions and salt, said fluid comprising a substantially saturated water solution of a salt selected from the group consisting of alkali metal and alkaline earth metal salts, said saturated solution containing oil emulsified therein as an oil-in-brine emulsion and including saponin in an amount effective to stabilize the emulsion of oil-in-brine.

2. A drilling fluid in accordance with claim 1 containing drilling mud clay.

3. A drilling fluid in accordance with claim 1 wherein the alkaline earth metal salt is a salt of calcium.

4. A drilling fluid in accordance with claim 1 containing starch.

5. A drilling fluid in accordance with claim 4 wherein the alkaline earth metal salt is a salt of calcium.

6. In a process for drilling a well with well drilling tools wherein there is circulated in the well an aqueous brine-base, oil-in-brine emulsion type of drilling fluid containing material suspended in sufficient brine to render the same circulatable, the method of overcoming instability of said fluid in the presence of calcium ions and salt in underground formations encountered during the drilling which comprises admixing with said drilling fluid sufficient salt of the group consisting of alkali metal salts, alkaline earth metal salts and mixtures thereof to form a substantially saturated brine solution and adding thereto an amount of saponin sufficient to stabilize the emulsion of the oil-in-brine and lower the fluid loss to said formation and contacting the wall of said well with the resulting drilling fluid.

7. In a process for drilling a well with well drilling tools wherein there is circulated in the well an aqueous oil emulsion type of brine-base drilling fluid containing oil emulsified as the disperse phase, in sufficient brine to render the same circulatable, the method of overcoming instability of said fluid in the presence of calcium ions and salt in underground formations encountered during the drilling which comprises admixing with said drilling fluid sufficient salt of the group consisting of alkali metal salts, alkaline earth metal salts and mixtures thereof, to form a substantially saturated brine solution and adding thereto an amount of saponin sufficient to stabilize the emulsion of the oil-in-brine and lower the fluid loss to said formation and contacting the wall of said well with the resulting drilling fluid.

8. The method according to claim 7 wherein the drilling fluid contains drilling mud clay and starch.

References Cited in the file of this patent

UNITED STATES PATENTS

| | | |
|---|---|---|
| 2,336,171 | Freeland | Dec. 7, 1943 |
| 2,371,955 | Dawson | Mar. 20, 1945 |
| 2,497,398 | Dawson | Feb. 14, 1950 |
| 2,551,768 | Sherborne | May 8, 1951 |
| 2,555,794 | Henkes | June 5, 1951 |
| 2,582,323 | Fischer | Jan. 15, 1952 |

OTHER REFERENCES

Gregory: Uses and Applications of Chemical and Related Materials (1939), p. 513.

Berkman and Egloff: "Emulsions and Foams" pages 90 and 175, Reinhold Publishing Corp., New York, N. Y., 1941.